(12) United States Patent
Freitag et al.

(10) Patent No.: US 12,261,309 B2
(45) Date of Patent: Mar. 25, 2025

(54) CO-AXIAL GLASS-TO-METAL SEAL FOR A CASE-NEUTRAL ELECTROCHEMICAL CELL

(71) Applicant: Greatbatch Ltd., Clarence, NY (US)

(72) Inventors: Gary Freitag, East Aurora, NY (US); Paul T. Hallifax, Gasport, NY (US); Michael F. Scalise, Clarence, NY (US)

(73) Assignee: Greatbatch Ltd., Clarence, NY (US)

( * ) Notice: Subject to any disclaimer, the term of this patent is extended or adjusted under 35 U.S.C. 154(b) by 0 days.

(21) Appl. No.: 18/599,318

(22) Filed: Mar. 8, 2024

(65) Prior Publication Data
US 2024/0304913 A1 Sep. 12, 2024

Related U.S. Application Data

(60) Provisional application No. 63/451,385, filed on Mar. 10, 2023.

(51) Int. Cl.
| | |
|---|---|
| *H01M 50/191* | (2021.01) |
| *H01M 50/119* | (2021.01) |
| *H01M 50/148* | (2021.01) |
| *H01M 50/152* | (2021.01) |
| *H01M 50/184* | (2021.01) |

(52) U.S. Cl.
CPC ....... *H01M 50/191* (2021.01); *H01M 50/119* (2021.01); *H01M 50/152* (2021.01); *H01M 50/154* (2021.01); *H01M 50/184* (2021.01)

(58) Field of Classification Search
None
See application file for complete search history.

(56) References Cited

U.S. PATENT DOCUMENTS

| | | | |
|---|---|---|---|
| 4,308,323 A | 12/1981 | Bowsky | |
| 4,678,358 A | 7/1987 | Layher | |
| 4,915,719 A | 4/1990 | Saffari | |
| 5,013,615 A | 5/1991 | Sisolak | |
| 6,569,562 B1 | 5/2003 | Spillman et al. | |
| 6,610,443 B2 | 8/2003 | Paulot et al. | |

(Continued)

OTHER PUBLICATIONS

Hellstrom, Eric E., Crystallization in TA-23 Glass Prepared by Sandia National Laboratories, Albuquerque, New Mexico 87185 and Livermore, California 94550 for the United States Department of Energy under Contract DE-AC04-76DP00789., Jan. 1, 1986, 1-39.

(Continued)

*Primary Examiner* — Matthew T Martin
*Assistant Examiner* — Ankith R Sripathi
(74) *Attorney, Agent, or Firm* — Michael F. Scalise

(57) ABSTRACT

A case-neutral electrochemical cell has an electrode assembly comprising a separator positioned between an anode and a cathode housed inside a casing. The casing supports a co-axial glass-to-metal seal comprising an inner insulating glass hermetically sealed to a terminal pin and to the inner annular surface of an inner ferrule. An outer insulating glass is hermetically sealed to the outer annular surface of the inner ferrule and the inner annular surface of an outer ferrule, and the outer ferrule is secured to an opening in the casing. Then, one of the anode and the cathode is connected to the terminal pin and the other of the anode and the cathode is connected to the first or inner ferrule. An electrolyte is provided in the casing to activate the electrode assembly.

13 Claims, 6 Drawing Sheets

(56) References Cited

U.S. PATENT DOCUMENTS

| | | | |
|---|---|---|---|
| 6,661,168 | B1 | 12/2003 | Hartley et al. |
| 6,759,163 | B2 | 7/2004 | Frysz et al. |
| 7,128,765 | B2 | 10/2006 | Paulot et al. |
| 7,687,200 | B2 * | 3/2010 | Jouanneau-Si-Larbi ................... C03C 27/044 429/188 |
| 9,123,930 | B1 | 9/2015 | Freitag |
| 12,095,102 | B2 | 9/2024 | Hallifax et al. |
| 2005/0255380 | A1 | 11/2005 | Lasater et al. |
| 2009/0181298 | A1 | 7/2009 | Farrell et al. |
| 2017/0149028 | A1 * | 5/2017 | Kroll ........................ C03C 4/20 |
| 2022/0059890 | A1 * | 2/2022 | Freitag ................ H01M 50/154 |

OTHER PUBLICATIONS

Watkins, Randall D., "Development of CABAL Glasses for Use in Lithium Ambient-Temperature Batteries", Jun. 1987, 1-21.

* cited by examiner

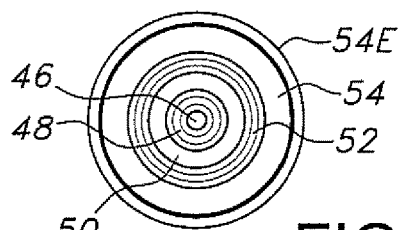
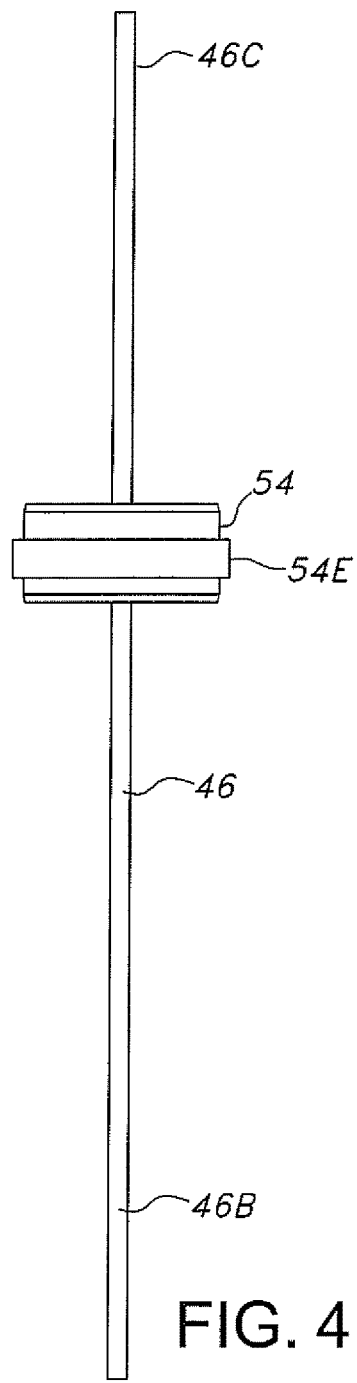
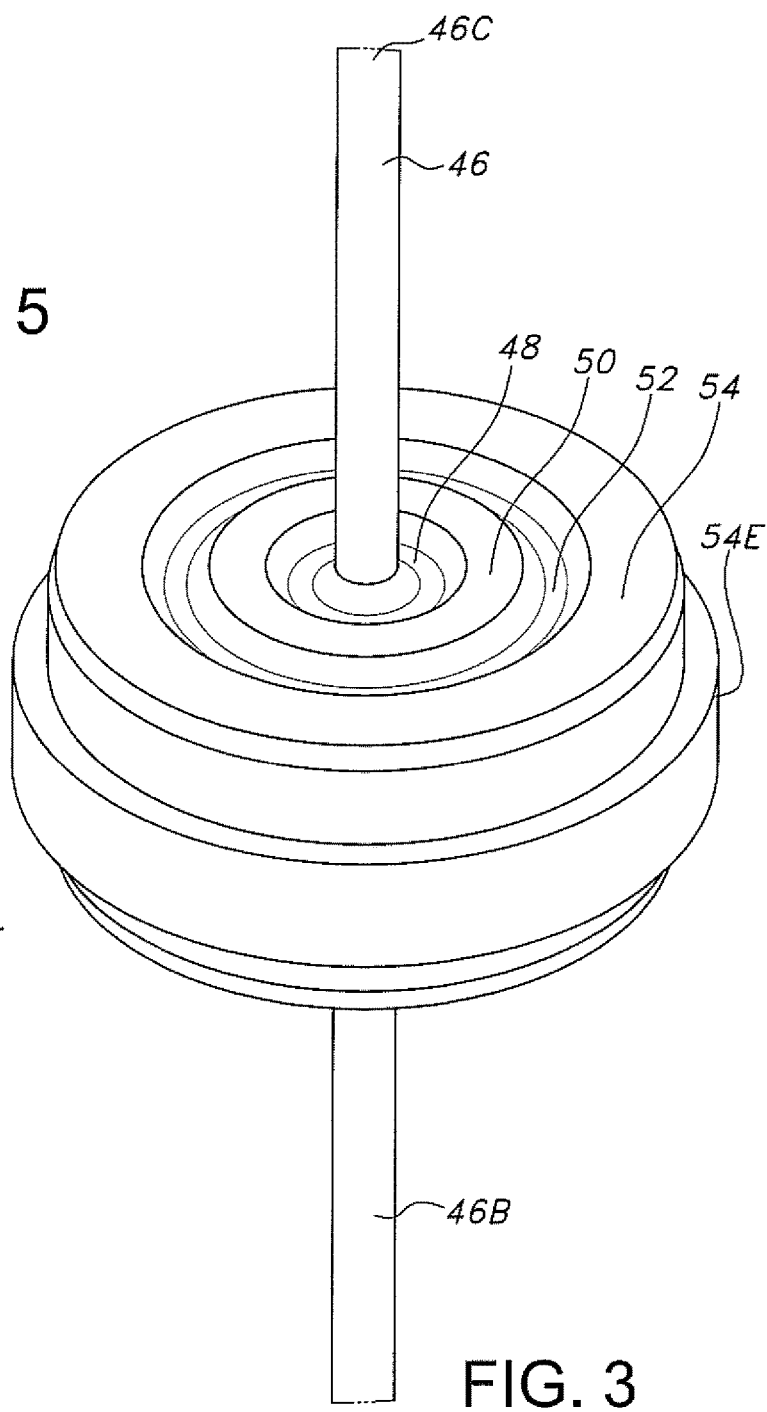
FIG. 5
FIG. 4
FIG. 3

CO-AXIAL GLASS-TO-METAL SEAL FOR A CASE-NEUTRAL ELECTROCHEMICAL CELL

CROSS-REFERENCE TO RELATED APPLICATION

This application claims priority to U.S. provisional patent application Ser. No. 63/451,385, filed on Mar. 10, 2023.

BACKGROUND OF THE INVENTION

1. Field of the Invention

The present invention generally relates to the conversion of chemical energy to electrical energy and, more particularly, to a novel co-axial glass-to-metal seal (GTMS) design for hermetically sealing a case-neutral electrochemical cell.

A glass-to-metal seal is considered critical because it hermetically isolates the internal environment of a component from the external environment to which the component is exposed. In an electrochemical cell powering an implantable medical device, the GTMS supports at least one terminal pin that extends from inside the cell casing to outside the casing while simultaneously hermetically sealing the internal cell chemistry from the external device environment.

2. Prior Art

A conventional glass-to-metal seal (GTMS) for an electrochemical cell typically consists of a sleeve-shaped ferrule that is welded into an opening in the cell casing, such as in an opening in the casing lid or the casing body itself. The ferrule supports an insulating glass in a surrounding relationship and the glass in turn seals around the perimeter of a terminal pin. The terminal pin extends from inside the casing to a position outside the casing and serves as the lead for one of the electrodes. Typically, the terminal pin is connected to the cathode current collector. The casing including the lid serves as the second terminal for the other electrode, typically the anode. This configuration is referred to as a case-negative cell design. Alternatively, if a case-positive cell design is desired, the anode is connected to the terminal pin and the cathode is connected to the cell casing, which includes the casing lid and ferrule.

However, there are cell designs that are neither case-negative nor case-positive. Instead, they are case-neutral. In a case-neutral cell design, the casing including its lid connected to a ferrule is not connected to either the anode or the cathode. For example, in the design described in U.S. Pat. No. 9,123,930 to Freitag, which is assigned to the assignee of the present invention and incorporated herein by reference, the lid supports two glass-to-metal seals. The terminal pin of the first GTMS is connected to the anode and the terminal pin of the second GTMS is connected to the cathode. This means that the casing lid must be large enough to support both GTMSs. However, modern cell designs are being driven by the ever-progressing desire to make implantable devices smaller and smaller without compromising functionality. This means that there is not always enough space in a casing lid to accommodate two GTMSs while maintaining the case-neutral design.

What is therefore needed is an electrochemical cell that is built in a case-neutral design having a single terminal pin that is connected to one of the anode and the cathode. The other of the anode and the cathode is connected to an inner ferrule that is positioned between an inner insulating glass supporting the terminal pin and an outer insulating glass sealed to an outer ferrule connected to the cell casing, for example, the lid. In that manner, the inner ferrule is electrically isolated from both the outer ferrule/lid and the inner terminal pin.

Accordingly, the present invention is directed to a co-axial GTMS having an inner ferrule that is electrically isolated from an inner terminal pin and an outer ferrule. The co-axial GTMS is configured to be built into an electrochemical cell having a case-neutral design. The present invention also describes two manufacturing processes for making co-axial GTMSs that both overcome the shortcomings of the prior art dual GTMSs for case-neutral cell designs.

SUMMARY OF THE INVENTION

The present invention is directed to a hermetic co-axial glass-to-metal seal (GTMS) comprising a terminal pin that is electrically isolated from a first or inner ferrule by a first or inner insulating glass. The inner ferrule supporting the terminal pin and the inner insulating glass is supported in a second or outer ferrule by a second or outer insulating glass. The outer insulating glass is hermetically sealed to the inner ferrule and the outer ferrule. The outer ferrule is then welded into an opening in the cell casing.

The individual materials chosen for the components comprising the co-axial GTMS are critical and must meet the following design criteria. First, the terminal pin must be corrosion resistant to the internal cell chemistry, be weldable and modifiable for attachment to the end user's product and have sufficient electrical conductivity for the particular cell design. Secondly, the inner and outer insulating glasses need to be corrosion resistant to the internal cell chemistry and have sufficient electrical insulation for the particular cell design. Lastly, the inner and outer ferrules must be corrosion resistant to the internal cell chemistry, have sufficient electrical conductivity for the particular cell design, and be weldable for secondary operations.

In one embodiment of the present invention, a co-axial glass-to-metal seal is manufactured by positioning an outer sleeve-shaped insulating glass between and in contact with an outer ferrule and an inner ferrule, followed by a first heat treatment in a furnace. The first heat treatment hermetically seals the outer insulating glass to an outer annular surface of the inner ferrule and to an inner annular surface of the outer ferrule to provide a first GTMS. A terminal pin is then positioned inside an inner sleeve-shaped insulating glass and this subassembly is positioned inside the inner ferrule of the first GTMS, followed by a second heat treatment in a furnace. The second heat treatment hermetically seals the inner insulating glass to the terminal pin and to an inner annular surface of the inner ferrule to provide a co-axial GTMS. Preferably, the outer insulating glass has an outer glass softening temperature, and the inner insulating glass has an inner glass softening temperature that is less than the outer glass softening temperature of the outer insulating glass.

In another embodiment of the present invention, a co-axial glass-to-metal seal is manufactured by assembling the terminal pin, the inner sleeve-shaped insulating glass, and the inner ferrule together, followed by a first heat treatment in a furnace. The first heat treatment hermetically seals the inner insulating glass to the terminal pin and to an inner annular surface of the inner ferrule to provide a first GTMS. The first GTMS is then positioned inside the outer sleeve-shaped insulating glass which is positioned inside the outer ferrule, followed by a second heat treatment in a furnace.

The second heat treatment hermetically seals the outer insulating glass to the inner and outer ferrules to provide the co-axial GTMS. Preferably, the inner insulating glass has an inner glass softening temperature, and the outer insulating glass has an outer glass softening temperature that is less than the inner glass softening temperature of the inner insulating glass.

The furnace used for both embodiments may comprise a tube furnace, a box or batch furnace, a continuous belt furnace, and the like. The furnace may also comprise a single or a plurality of heating zones within which the heating profiles of the first and second heat treatments may be the same or different from other heating zones.

The resultant co-axial GTMS, whether produced by the first or the second embodiment of the present invention, must meet the following design criteria: the assembly must be hermetic, the inner and outer insulating glasses must exhibit acceptable visual characteristics, i.e., have no cracks that affect function, and there must be sufficient electrical insulation between the terminal pin and the first or inner ferrule and between the inner ferrule and the second or outer ferrule for the cell design. Also, the co-axial GTMS must exhibit acceptable thermal durability to secondary processing such as welding, and it must be mechanically tolerant to secondary processing such as terminal pin bending.

These and other aspects of the present invention will become increasingly more apparent to those skilled in the art by reference to the following detailed description and to the appended drawings.

BRIEF DESCRIPTION OF THE DRAWINGS

FIG. 3 is a perspective view of the co-axial GTMS 12 shown in FIGS. 1 and 2.

FIG. 4 is a side elevational view of the co-axial GTMS 12 shown in FIGS. 1 to 3.

FIG. 5 is a plan view of the co-axial GTMS 12 shown in FIGS. 1 to 4.

DETAILED DESCRIPTION OF THE PREFERRED EMBODIMENTS

The term "glass softening temperature" is the minimum temperature at which a glass begins to deform under its own weight. As defined herein, the "glass softening temperature" is the temperature at which a glass fiber having a diameter ranging from 0.55 mm to 0.75 mm and a length of 23.5 cm elongates under its own weight at a rate of 1 mm/min.

The term "glass working temperature" is herein defined as the temperature at which a glass has a viscosity of about $10^4$ poise. (For support, see Fundamentals of Inorganic Glasses, Arun K. Varshneya, 1994 p. 189.)

The glass softening temperature is generally at a lower temperature than the glass working temperature. The temperature interval between the glass softening point and the glass working point is herein defined as the "glass working range".

The term "viscosity" is herein defined as the resistance to flow in a fluid or semi-fluid.

The term "heat treatment" or "heating profile" is defined as the application of heat to a material starting at room temperature and increasing in a controlled manner to a maximum heating temperature and then decreasing the application of heat in a controlled manner back to room temperature. The heat treatment or heating profile may comprise a plurality of different heating or cooling rates as well as a plurality of temperature plateaus at which a temperature is held constant for a period of time.

Figure 1:
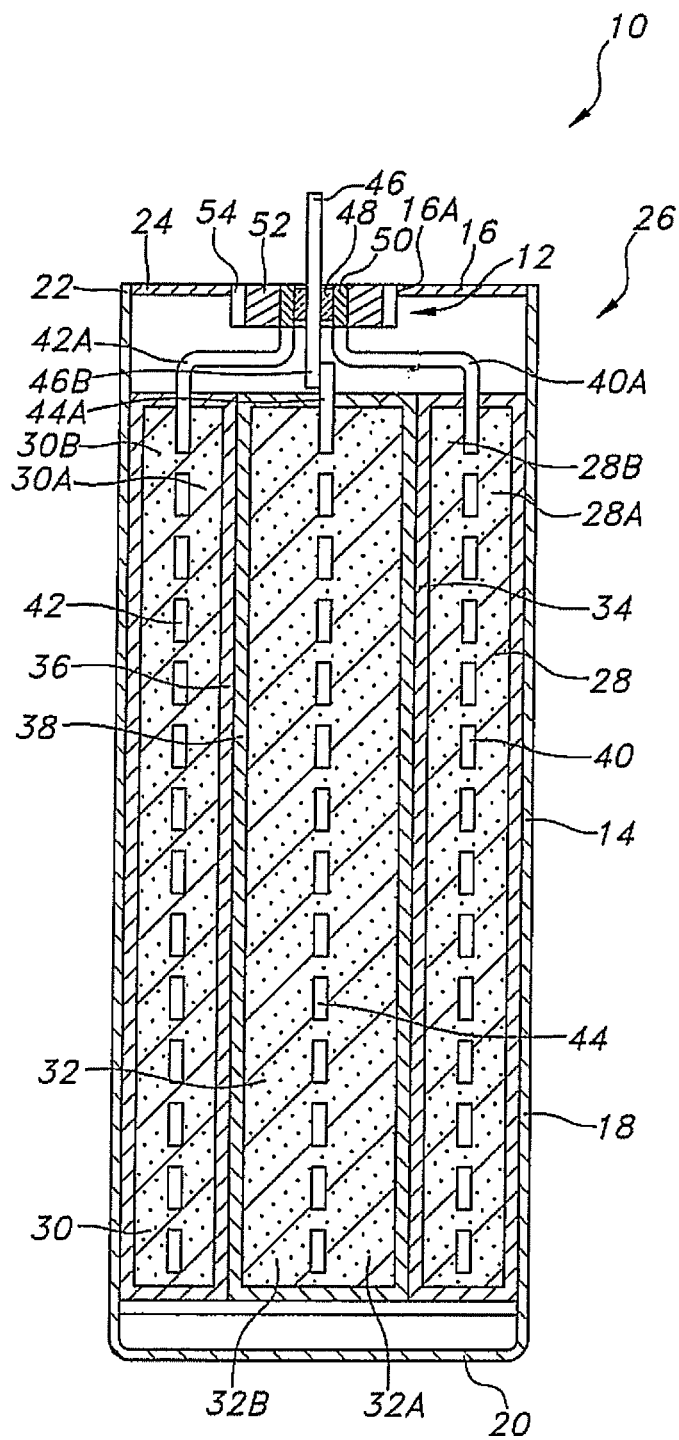
FIG. 1 is a cross-sectional view of an exemplary case-neutral electrochemical cell 10 including a co-axial glass-to-metal seal (GTMS) 12 according to the present invention.
Figure 1A:
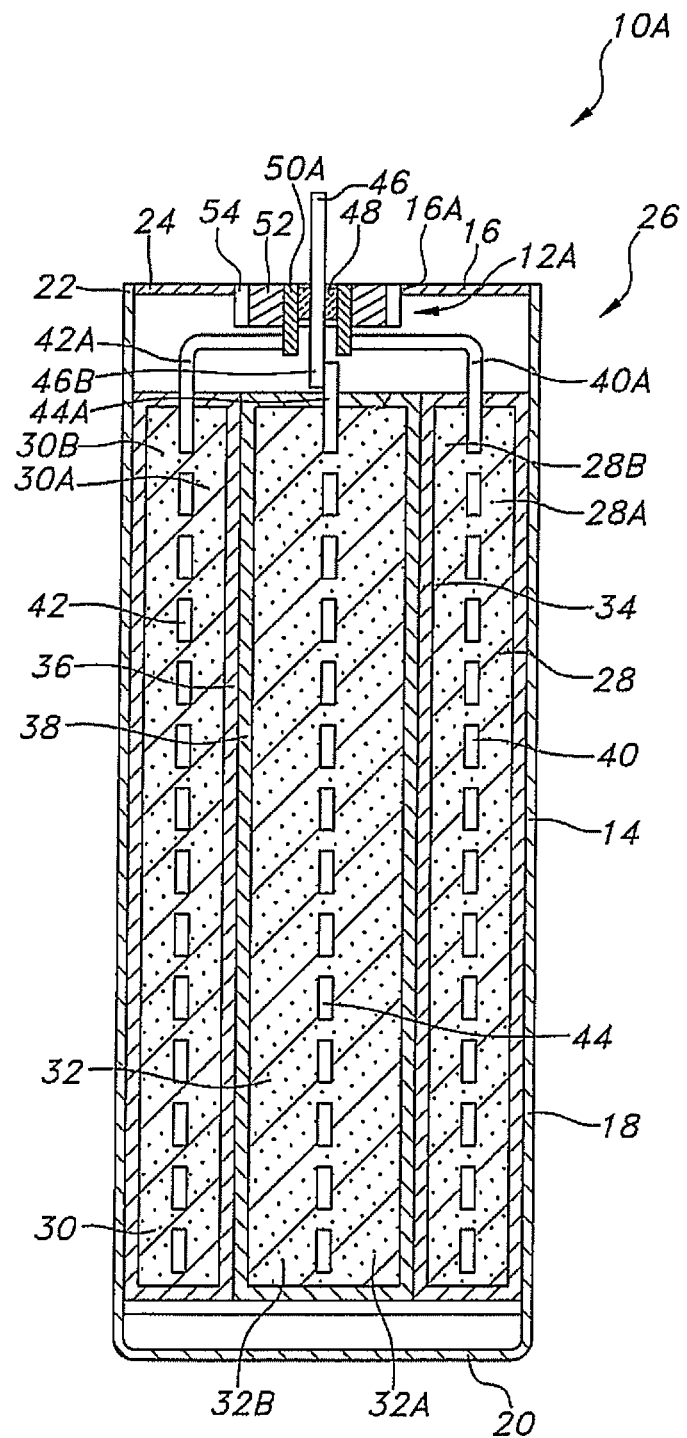
FIG. 1A is a cross-sectional view of another exemplary case-neutral electrochemical cell 10A including an alternate embodiment of a co-axial GTMS 12A according to the present invention.

Turning now to the drawings, FIGS. 1 and 1A illustrate two exemplary case-neutral electrochemical cells 10 and 10A according to the present invention. The exemplary cells 10, 10A are intended to provide context to the respective co-axial GTMS 12 and 12A of the present invention, which will be described in detail hereinafter.

The exemplary case-neutral electrochemical cells 10, 10A comprise an open-ended container 14 closed by a lid 16. The container 14 has an annular sidewall 18 extending upwardly from a bottom wall 20 to an annular upper edge 22. The lid 16 is a plate-shaped member extending to an annular edge 24. The edge 24 of the lid 16 is welded to the upper edge 22 of the container 14 to close the container and provide a casing 26 for the electrochemical cells 10, 10A.

In the illustrated exemplary electrochemical cells 10, 10A, the electrode assembly comprises two spaced-apart first electrodes 28 and 30 that are positioned on opposite sides of a second, opposite polarity electrode 32. The first electrodes 28, 30 are housed in respective separator envelopes 34 and 36, and the second electrode 32 is housed in its own separator envelope 38.

In one embodiment of the electrode assembly, the first electrodes 28, 30 are anodes comprising anode active material supported on respective anode current collectors 40 and 42, and the second electrode 32 is a cathode comprising cathode active material supported on a cathode current collector 44. In another embodiment, the first electrodes 28, 30 are cathodes comprising cathode active material supported on respective cathode current collectors 40, 42, and the second electrode is an anode comprising anode active material supported on an anode current collector 44.

With respect to the first embodiment of the electrode assembly, the right anode 28 is comprised of opposed plates 28A and 28B of anode active material that are contacted to the major sides of an intermediate anode current collector 40. A tab 40A extends upwardly from the right anode current collector 40. Similarly, the left anode 30 is comprised of opposed plates 30A and 30B of anode active material that are contacted to the major sides of an intermediate anode current collector 42. A tab 42A extends upwardly from the left anode current collector 42. The cathode 32 positioned between the right and left anodes 28, 30 is comprised of opposed plates 32A and 32B of cathode active material that are contacted to the major sides of an intermediate cathode current collector 44. A tab 44A extends upwardly from the cathode current collector 44.

In the second embodiment of the electrode assembly, the right cathode 28 is comprised of opposed plates 28A and 28B of cathode active material that are contacted to the major sides of an intermediate cathode current collector 40. A tab 40A extends upwardly from the right cathode current collector 40. Similarly, the left cathode 30 is comprised of opposed plates 30A and 30B of cathode active material that are contacted to the major sides of an intermediate cathode current collector 42. A tab 42A extends upwardly from the left cathode current collector 42. The anode 32 positioned between the right and left cathodes 28, 30 is comprised of opposed plates 32A and 32B of anode active material that are contacted to the major sides of an intermediate anode current collector 44. A tab 44A extends upwardly from the anode current collector 44.

FIGS. 2 to 5 show an exemplary embodiment of a co-axial glass-to-metal seal 12 according to the present invention that is suitable for incorporated into the case-neutral electrochemical cell 10 shown in FIG. 1. As particularly shown in FIG. 2, the exemplary co-axial GTMS 12 comprises a terminal pin 46, preferably made of molybdenum, which is supported by an inner sleeve-shaped insulating glass 48 which is supported by an inner ferrule 50. The inner ferrule 50 including the terminal pin 46 and inner insulating glass 48 is supported by an outer sleeve-shaped insulating glass 52 which is supported by an outer ferrule 54. The outer ferrule 54 is welded into an opening in the cell casing, such as an opening in the lid 16 or an opening in the casing container 18.

The inner sleeve-shaped insulating glass 48 extends from an inside meniscus end 48A residing inside the casing 26 to an outside meniscus end 48B. The inside and outside meniscus ends 48A, 48B in turn extend to an outer annular surface 48C spaced from an inner annular surface 48D of the inner sleeve-shaped insulating glass 48. The inner annular surface 48D defines a cylindrically-shaped opening 56.

The terminal pin 46 is hermetically sealed in the cylindrically-shaped opening 56 of the inner insulating glass 48. The terminal pin 46 is a rod-shaped member having an annular sidewall 46A that extends from a proximal end 46B to a distal end 46D. When the co-axial GTMS 12 of the present invention is built into the case-neutral electrochemical cell 10 (FIG. 1), the proximal pin end 46B extends into the interior of the casing 26 and the distal pin end 46C resides outside the casing to provide for connection to a load which the cell 10 is intended to power.

The inner ferrule 50 is a sleeve-shaped member having an annular sidewall that defines an inner ferrule opening and extends from an inside end 50A residing inside the casing 26 to an outside end 50B. The inside and outside ends 50A, 50B in turn extend to an outer annular surface 50C spaced from an inner annular surface 50D. In the exemplary co-axial GTMS 12, the outer annular surface 48C of the inner sleeve-shaped insulating glass 48 is hermetically sealed to the inner annular surface 50D of the inner ferrule 50.

The outer sleeve-shaped insulating glass 52 resides outwardly from the inner insulating glass 48 and is a sleeve-shaped member having an annular sidewall that extends from an inside meniscus end 52A residing inside the casing 26 to an outside meniscus end 52B. The inside and outside meniscus ends 52A, 52B in turn extend to an inner annular surface 52C spaced from an outer annular surface 52D. The inner annular surface 52C defines a cylindrically-shaped opening 58. In the exemplary co-axial GTMS 12, the inner annular surface 52C of the outer sleeve-shaped insulating glass 52 is hermetically sealed to the outer annular surface 50C of the inner ferrule 50.

The outer ferrule 54 is a sleeve-shaped member having an annular sidewall that resides outwardly from the inner ferrule 50. The outer ferrule 54 has an annular sidewall that defines an outer ferrule opening and extends from an inside end 54A located inside the casing 26 to an outside end 54B. The inside and outside ends 54A, 54B in turn extend to an outer annular surface 54C spaced from an inner annular surface 54D. An annular protrusion 54E extends outwardly from the outer annular surface 54C and is spaced from the inside and outside ends 54A, 54B. In the exemplary co-axial GTMS 12, the outer annular surface 52D of the outer sleeve-shaped insulating glass 52 resides in the outer ferrule opening where it is hermetically sealed to the inner annular surface 54D of the outer ferrule 54.

In the exemplary electrochemical cell 10A shown in FIG. 1A, the inside end 54A of the inner ferrule 50 extends a greater distance into the interior of the casing 26 than the inside end 54A of the outer ferrule. This is a significant distinction with respect to the GTMS 12 incorporated into the electrochemical cell 10 shown in FIGS. 2 to 5 because the extending inner ferrule 50 makes it easier to connect the current collector tabs 40A and 42A to the inner ferrule 50 than in the GTMS 12 shown in FIG. 1.

In one exemplary embodiment of a process for manufacturing the co-axial GTMS 12, 12A according to the present invention, a preferred material for the inner insulating glass 48 is TA-23, which is an alkaline earth aluminosilicate type glass developed by Sandia National Labs. TA-23 has a melting temperature of about 775° C. A preferred outer insulating glass 52 is Cabal-12, which is a calcium-boro-aluminate type glass that was also developed by Sandia National Labs. Cabal-12 has a melting temperature of about 925° C.

Figure 6:
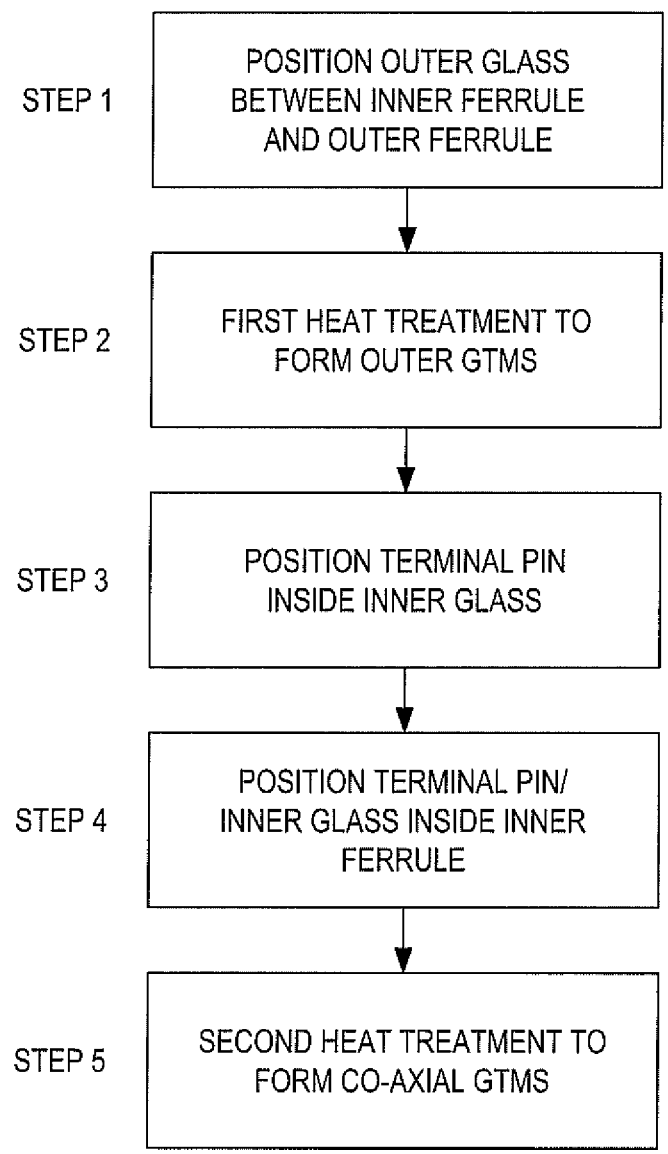
FIG. 6 is a flow chart illustrating the steps for manufacturing one embodiment of the co-axial GTMS 12 shown in FIGS. 1 to 5.

In this embodiment, which is illustrated in the flow diagram shown in FIG. 6, the outer sleeve-shaped Cabal-12 sealing glass 52 is positioned in the outer ferrule opening and between the inner and outer ferrules 50 and 54 (Step 1). This assembly is then subjected to a heating protocol (Step 2) to melt the Cabal-12 outer insulating glass 52 (melting temperature of about 925° C.) and cause that glass to flow into intimate sealing contact with the inner and outer ferrules 50, 54. When the molten outer insulating glass 52 cools, that glass hermetically seals to the outer annular surface 50C of the inner ferrule 50 and to the inner annular surface 54D of the outer ferrule 54 to form an outer GTMS. In this embodiment, the maximum heating temperature of the first heat treatment for Cabal-12 ranges from about 900° C. to about 950° C.

Next, in Step 3, the terminal pin 46 is positioned in the cylindrically-shaped opening 56 of the inner sleeve-shaped TA-23 insulating glass 48 so that the inner annular surface 48D of the inner insulating glass 48 contacts the annular sidewall 46A of the terminal pin 46. In Step 4, the terminal pin 46/inner TA-23 insulating glass 48 subassembly is then positioned in the opening in the inner ferrule 50 so that the inner annular surface 50D of the inner ferrule 50 contacts the outer annular surface 48C of the inner insulating glass 48. This assembly is then subjected to a second heating protocol or second heat treatment (Step 5) to melt the inner TA-23 insulating glass 48 (melting temperature of about 775° C.) and cause that glass to flow into intimate sealing contact with the terminal pin 46 and the inner ferrule 50. When the molten inner insulating glass 48 cools, that glass hermetically seals to the annular sidewall 46A of the terminal pin 46 and to the inner annular surface 50D of the inner ferrule 50. This forms the co-axial GTMS 12, 12A according to the present invention. Preferably, the maximum heating temperature for the second heat treatment in the flow process depicted in FIG. 6 ranges from about 750° C. to about 800° C.

The sequential heating protocol described above and shown in FIG. 6 is important because Cabal-12 as the preferred outer insulating glass 52 has a melting temperature of about 925° C., which is significantly higher than the melting temperature of about 775° C. for TA-23 as the preferred inner insulating glass. The significantly lower melting temperature of the TA-23 insulating glass will not affect the hermeticity of the Cabal-12 insulating glass sealed to the inner annular surface 54D of the outer ferrule 54 and to the outer annular surface of the inner ferrule 50. It is contemplated that there could be a plurality of heat treatment protocols such that the maximum heating temperature of the second heat treatment does not exceed the softening temperature of the Cabal-12 outer insulating glass 52.

In another preferred exemplary embodiment of a process for manufacturing the co-axial GTMS 12, 12A according to the present invention, the inner and outer insulating glasses 48, 52 are reversed from the embodiment described above. In this second exemplary embodiment, the inner insulating glass 48 is Cabal-12 (melting temperature of about 925° C.) and the outer insulating glass 52 is TA-23 (melting temperature of about 755° C.).

Figure 7:
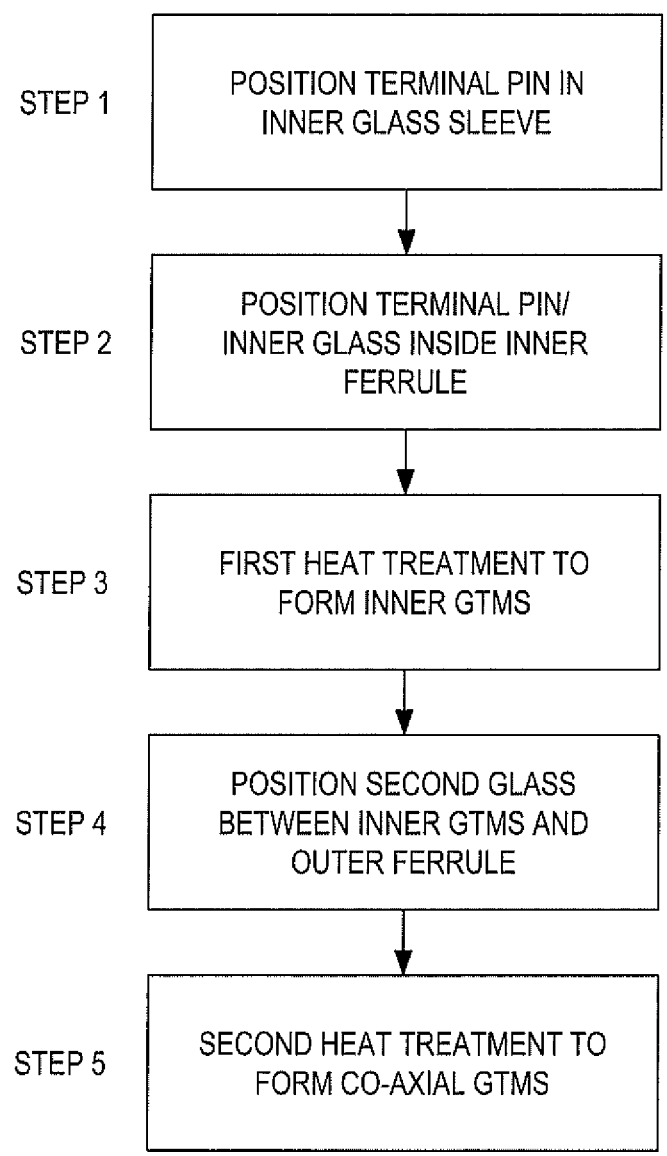
FIG. 7 is a flow chart illustrating the steps for manufacturing another embodiment of the co-axial GTMS 12 shown in FIGS. 1 to 5.

In this embodiment, which is illustrated in the flow diagram shown in FIG. 7, the terminal pin 46 is positioned in the cylindrically-shaped opening 56 of the Cabal-12 inner sleeve-shaped insulating glass 48 (Step 1) so that the inner annular surface 48D of the inner insulating glass 48 contacts the annular sidewall 46A of the terminal pin 46. The terminal pin 46/inner insulating glass 48 is then positioned in the opening in the inner ferrule (Step 2) so that the inner annular surface 50D of the inner ferrule 50 contacts the outer annular surface 48C of the inner insulating glass 48. This subassembly is then subjected to a first heating protocol (Step 3) to melt the Cabal-12 inner insulating glass 48 (melting temperature of about 925° C.) and cause that glass to flow into intimate sealing contact with the terminal pin 46 and the inner ferrule 50. When the molten Cabal-12 inner insulating glass 48 cools, that glass hermetically seals to the annular sidewall 46A of the terminal pin 46 and to the inner annular surface 50D of the inner ferrule 50. In this embodiment, the maximum heating temperature of the first heat treatment for Cabal-12 ranges from about 900° C. to about 950° C.

Next, the outer TA-23 sleeve-shaped sealing glass 52 is positioned in the opening of the outer ferrule and between the inner and outer ferrules 50 and 54 (Step 4). This assembly is then subjected to a second heating protocol (Step 5) to melt the outer TA-23 insulating glass 52 (melting temperature of about 775° C.) and cause that glass to flow into intimate sealing contact with the inner and outer ferrules 50, 54. When the molten outer insulating glass 52 cools, that glass hermetically seals to the outer annular surface 50C of the inner ferrule 50 and to the inner annular surface 54D of the outer ferrule 54. This forms the co-axial GTMS 12, 12A according to the second exemplary embodiment of the present invention.

Again, the sequential heating protocol described above for the second exemplary embodiment is important because Cabal-12 as the preferred inner insulating glass 48 has a melting temperature of about 925° C., which is significantly higher than the melting temperature of about 775° C. for TA-23 as the preferred outer insulating glass. The significantly lower melting temperature of the TA-23 insulating glass will not affect the hermeticity of the Cabal-12 insulating glass sealed to the terminal pin 46 and the inner annular surface 50D of the inner ferrule 50. Preferably, the maximum heating temperature for the second heat treatment in the flow process depicted in FIG. 7 ranges from about 750° C. to about 800° C.

The sequential heating protocol described above and shown in FIG. 7 is important because Cabal-12 as the preferred inner insulating glass 48 has a melting temperature of about 925° C., which is significantly higher than the melting temperature of about 775° C. for TA-23 as the preferred outer insulating glass 52. The significantly lower melting temperature of the TA-23 insulating glass will not affect the hermeticity of the Cabal-12 insulating glass sealed to the terminal pin 46 and to the inner annular surface 50D of the inner ferrule 50. It is contemplated that there could be a plurality of heat treatment protocols such that the maximum heating temperature of the second heat treatment does not exceed the softening temperature of the Cabal-12 inner insulating glass 48.

The terminal pin 46 is preferably composed of an electrically conductive material, for example, MP35N, stainless steel, titanium alloy, platinum, platinum alloys, palladium, palladium alloys or a refractory metal such as molybdenum. A preferred material for the casing including the lid 16 closing the open-ended container 18 is titanium although stainless steel, such as 304L SS, mild steel, nickel-plated mild steel and aluminum are also suitable. Preferred materials for the inner and outer ferrules 50 and 54 include titanium, stainless steel, such as 304 SS, mild steel, nickel-plated mild steel, and aluminum.

Figure 2:
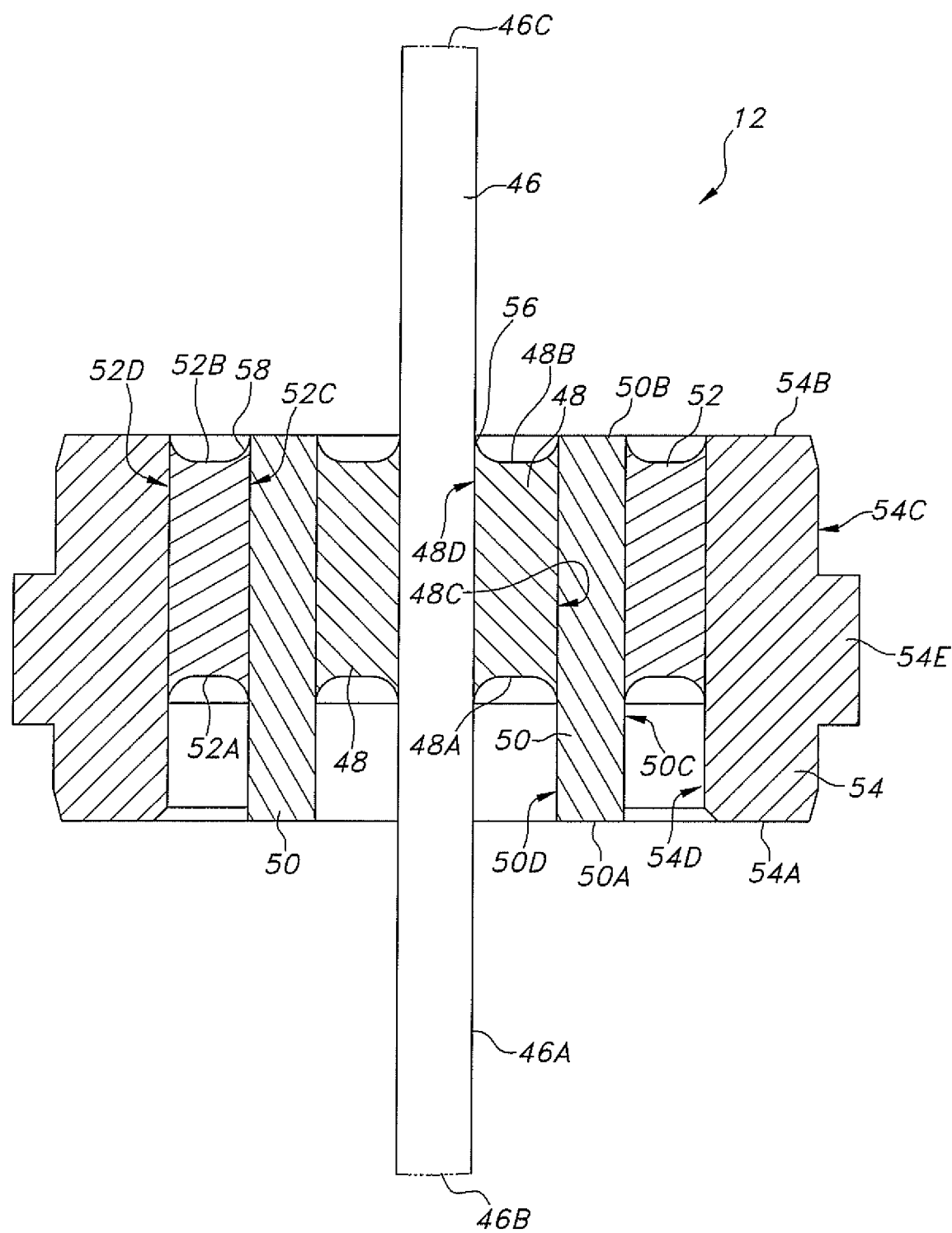
FIG. 2 is a cross-sectional view of the co-axial GTMS 12 shown in the case-neutral electrochemical cell 10 of FIG. 1.

The co-axial GTMS 12 shown in FIG. 2 is then hermetically secured to the casing 26. This is done by welding the outer ferrule 54 in a suitably sized opening in the lid 16. The annular protrusion 54E extending outwardly from the outer annular surface 54C of the outer ferrule 54 helps ensure that the outside ends 50B and 54B of the respective inner and outer ferrules 50 and 54 are flush with the upper surface of the lid 16 (FIG. 1). The exemplary electrochemical cell 10 illustrated in FIG. 1 further shows that the inside ends 50A and 54A of the respective inner and outer ferrule 50, 54 extending into the interior of the casing are aligned along a common plane.

Once the co-axial GTMS 12 is created and the outer ferrule 54 is welded into an opening 16A in the lid 16, the proximal end 46B of the terminal pin 46 is electrically connected to either the anode or the cathode housed inside the cell casing 26 and the other of the anode and the cathode is electrically connected to the inner ferrule 50 (FIGS. 1 and 1A).

The exemplary case-neutral electrochemical cell 10A shown in FIG. 1A is constructed in a similar manner as the just described electrochemical cell 10 shown in FIG. 1 with the exception of the GTMS 12A. In the exemplary electrochemical cell 10A shown in FIG. 1A, the inside end 50A of the inner ferrule 50 extends a greater distance into the interior of the casing 26 than the inside end 54A of the outer ferrule. This is a significant distinction because the extending inner ferrule 50 makes it easier to connect the current collector tabs 40A and 42A to the inner ferrule 50 than in the GTMS 12 shown in FIG. 1.

After the terminal pin 46 and the inner ferrule 50 are electrically connected to their respective electrode, the lid 16 is hermetically secured to the annular edge 22 at the open end of the container 18. The lid 16 may be hermetically sealed to the casing container 18 through such joining means as laser welding, resistance welding, ultrasonic welding, magnetic force welding, arc welding, soldering, and the like. An activating electrolyte (not shown) is then filled into the casing 26 through an electrolyte fill port or fill opening (not shown) in the lid 16. The fill port is then hermetically closed, such as by laser welding a plug into the port or by melting the lid material to close the opening.

The electrochemical cells 10 and 10A can also have a spirally-wound configuration.

In one embodiment, the electrochemical cells 10 and 10A are secondary or rechargeable cells. In a secondary system, the anode comprises a material capable of intercalating and de-intercalating the alkali metal, and preferably lithium. A carbonaceous anode comprising any of the various forms of carbon (e.g., coke, graphite, acetylene black, carbon black, glassy carbon, etc.), which are capable of reversibly retaining the lithium species, is preferred. Graphite is particularly preferred due to its relatively high lithium-retention capacity. Regardless the form of the carbon, fibers of the carbonaceous material are particularly advantageous because they have excellent mechanical properties that permit them to be fabricated into rigid electrodes capable of withstanding degradation during repeated charge/discharge cycling.

The cathode of a secondary cell preferably comprises a lithiated material that is stable in air and readily handable. Examples of such air-stable lithiated cathode materials include oxides, sulfides, selenides, and tellurides of such metals as vanadium, titanium, chromium, copper, molybdenum, niobium, iron, nickel, cobalt, and manganese. The more preferred oxides include $LiNiO_2$, $LiMn_2O_4$, $LiCoO_2$, $LiCO_{0.92}SnO_{0.08}O_2$ and $LiCo_{1-x}Ni_xO_2$.

The lithiated active material is preferably mixed with a conductive additive selected from acetylene black, carbon black, graphite, and powdered metals of nickel, aluminum, titanium, and stainless steel. The cathode further comprises a fluoro-resin binder, preferably in a powder form, such as PTFE, PVDF, ETFE, polyamides and polyimides, and mixtures thereof. The current collector is selected from stainless steel, titanium, tantalum, platinum, gold, aluminum, cobalt nickel alloys, highly alloyed ferritic stainless steel containing molybdenum and chromium, and nickel-, chromium- and molybdenum-containing alloys.

Suitable nonaqueous electrolytes for a secondary electrochemical systems comprise an inorganic salt dissolved in a nonaqueous solvent and, more preferably, a lithium metal salt dissolved in a quaternary mixture of organic carbonate solvents comprising a dialkyl (non-cyclic) carbonate selected from dimethyl carbonate (DMC), diethyl carbonate (DEC), dipropyl carbonate (DPC), ethyl methyl carbonate (EMC), methyl propyl carbonate (MPC) and ethyl propyl carbonate (EPC), and mixtures thereof, and at least one cyclic carbonate selected from propylene carbonate (PC), ethylene carbonate (EC), butylene carbonate (BC) and vinylene carbonate (VC), and mixtures thereof. Organic carbonates are generally used in the electrolyte solvent system for such battery chemistries because they exhibit high oxidative stability toward cathode materials and good kinetic stability toward anode materials.

In another embodiment, the electrochemical cells 10 and 10A are primary cells. A primary electrochemical cell that possesses sufficient energy density and discharge capacity for the rigorous requirements of implantable medical devices comprises a lithium anode or its alloys, for example, Li—Si, Li—Al, Li—B and Li—Si—B. The form of the anode may vary, but preferably it is of a thin sheet or foil pressed or rolled on a metallic anode current collector.

The cathode for a primary cell is an electrically conductive material, preferably a solid material. The solid cathode may comprise a metal element, a metal oxide, a mixed metal oxide, a metal sulfide, and combinations thereof. A preferred cathode active material is selected from silver vanadium oxide, copper silver vanadium oxide, manganese dioxide, cobalt nickel, nickel oxide, copper oxide, copper sulfide, iron sulfide, iron disulfide, titanium disulfide, copper vanadium oxide, and mixtures thereof.

Before fabrication into an electrode for incorporation into an electrochemical cell 10, 10A, the cathode active material is mixed with a binder material such as a powdered fluoropolymer, more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium, and stainless steel. The preferred cathode active mixture thus includes a powdered fluoro-polymer binder present at about 3 weight percent, a conductive diluent present at about 3 weight percent and about 94 weight percent of the cathode active material.

The cathode may be prepared by rolling, spreading, or pressing the cathode active mixture onto a suitable cathode current collector. Cathodes prepared as described are preferably in the form of a strip wound with a corresponding strip of anode material in a structure similar to a "jellyroll" or a flat-folded electrode stack.

A primary electrochemical cell includes a nonaqueous, ionically conductive electrolyte having an inorganic, ionically conductive salt dissolved in a nonaqueous solvent and, more preferably, a lithium salt dissolved in a mixture of a low viscosity solvent and a high permittivity solvent. The salt serves as the vehicle for migration of the anode ions to intercalate or react with the cathode active material. Suitable salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LIN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Suitable low viscosity solvents for a primary system include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate, methyl propyl carbonate, ethyl propyl carbonate, diethyl carbonate, dipropyl carbonate, and mixtures thereof. High permittivity solvents for a primary system include cyclic carbonates, cyclic esters, and cyclic amides such as propylene carbonate (PC), ethylene carbonate (EC), butylene carbonate, acetonitrile, dimethyl sulfoxide, dimethyl, formamide, dimethyl acetamide, γ-valerolactone, γ-butyrolactone (GBL), N-methyl-pyrrolidinone (NMP), and mixtures thereof. The preferred electrolyte for a lithium primary cell is 0.8M to 1.5M $LiAsF_6$ or $LiPF_6$ dissolved in a 50:50 mixture, by volume, of PC as the preferred high permittivity solvent and DME as the preferred low viscosity solvent.

Regardless of whether the electrochemical cell 10, 10A is a primary or secondary system, in order to prevent internal short circuit conditions, the cathode is separated from the anode by at least one separator 34, 36 and 38. A suitable separator is preferably made of a fabric woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.).

It is appreciated that various modifications to the inventive concepts described herein may be apparent to those of ordinary skill in the art without departing from the spirit and scope of the present invention as defined by the appended claims.

What is claimed is:

1. A case-neutral electrochemical cell, comprising:
   a) a casing comprising an open-ended container closed by a lid, wherein the casing has an opening;
   b) an electrode assembly housed inside the casing, the electrode assembly comprising an anode and a cathode separated from direct physical contact with each other by an intermediate separator;
   c) a co-axial glass-to-metal seal, comprising:
      i) a terminal pin extending along a terminal pin axis;
      ii) an inner ferrule comprising an inner ferrule sidewall extending to an inner ferrule inside end residing inside the casing spaced from an inner ferrule outside end residing outside the casing, wherein the inner ferrule inside and outside ends extend to an inner ferrule inner annular surface opposite an inner ferrule outer annular surface;
      iii) an inner insulating glass hermetically sealed to the terminal pin and to the inner annular surface of the inner ferrule, wherein the inner insulating glass has an inner insulating glass melting temperature;
      iv) an outer ferrule comprising an outer ferrule sidewall extending to an outer ferrule inside end residing inside the casing spaced from an outer ferrule outside end residing outside the casing, wherein the outer ferrule inside and outside ends extend to an outer ferrule inner annular surface opposite an outer ferrule outer annular surface; and
      v) an outer insulating glass hermetically sealed to the outer annular surface of the inner ferrule and to the inner annular surface of the outer ferrule, wherein the outer insulating glass has an outer insulating glass melting temperature;
      vi) wherein the outer ferrule outer annular surface is secured to the casing in the casing opening, and
      vii) wherein the inner insulating glass comprises TA-23 having an inner insulating glass melting temperature of about 775° C. that is less than the outer insulating glass comprising Cabal-12 having an outer insulating glass melting temperature of about 925° C., or the inner insulating glass comprises Cabal-12 having an inner insulating glass melting temperature of about 925° C. that is greater than the outer insulating glass comprising TA-23 having an outer insulating glass melting temperature of about 775° C., and
   d) wherein one of the anode and the cathode is electrically connected to the terminal pin and the other of the anode and the cathode is electrically connected to the inner ferrule; and
   e) an electrolyte provided in the casing to activate the electrode assembly.

2. The case-neutral electrochemical cell of claim 1, wherein the inside ends of the inner and outer ferrules reside along a plane inside the casing that is substantially perpendicular to the terminal pin axis.

3. The case-neutral electrochemical cell of claim 1, wherein the inside end of the inner ferrule extends further into the casing than the inside end of the outer ferrule.

4. The case-neutral electrochemical cell of claim 1 of either a primary or a secondary chemistry.

5. The case-neutral electrochemical cell of claim 1 of a primary chemistry having the anode of an alkali metal and the cathode of a cathode active material selected from a carbonaceous material, a fluorinated carbon, a metal, a metal oxide, a mixed metal oxide, a metal sulfide, and mixtures thereof.

6. The case-neutral electrochemical cell of claim 1 of a secondary chemistry having the anode of carbon or graphite and the cathode of a cathode active material selected from $LiNiO_2$, $LiMn_2O_4$, $LiCoO_2$, $LiCO_{0.92}SnO_{0.08}O_2$ and $LiCo_{1-x}Ni_xO_2$.

7. The case-neutral electrochemical cell of claim 1, wherein the casing is selected from titanium, stainless steel, mild steel, nickel-plated mild steel, and aluminum.

8. A lid assembly for a casing for an electrochemical cell, the lid assembly comprising:
   a) lid comprising a lid first surface spaced from a lid second surface, wherein the lid has a lid opening; and
   b) a co-axial glass-to-metal seal, comprising:
      i) a terminal pin extending along a longitudinal axis;
      ii) an inner ferrule comprising an inner ferrule sidewall extending to an inner ferrule first end spaced from an inner ferrule second end, wherein the inner ferrule first and second ends extend to an inner ferrule inner annular surface opposite an inner ferrule outer annular surface;
      iii) an inner insulating glass hermetically sealed to the terminal pin and to the inner annular surface of the inner ferrule, wherein the inner insulating glass has an inner insulating glass melting temperature;
      iv) an outer ferrule comprising an outer ferrule sidewall extending to an outer ferrule first end spaced from an outer ferrule second end, wherein the outer ferrule first and second ends extend to an outer ferrule inner annular surface opposite an outer ferrule outer annular surface; and
      v) an outer insulating glass hermetically sealed to the outer annular surface of the inner ferrule and to the inner annular surface of the outer ferrule, wherein the outer insulating glass has an outer insulating glass melting temperature; and
      vi) wherein the inner insulating glass comprises TA-23 having an inner insulating glass melting temperature of about 775° C. that is less than the outer insulating glass comprising Cabal-12 having an outer insulating glass melting temperature of about 925° C., or the inner insulating glass comprises Cabal-12 having an inner insulating glass melting temperature of about 925° C. that is greater than the outer insulating glass comprising TA-23 having an outer insulating glass melting temperature of about 775° C., and
   c) wherein the outer annular surface of the outer ferrule of the co-axial glass-to-metal seal is secured to the lid in the lid opening so that the inner and outer ferrule first ends reside adjacent to the lid first surface and the inner and outer ferrule second ends reside adjacent to the lid second surface.

9. The lid assembly of claim 8, wherein the first ends of the inner and outer ferrules reside along a plane that is aligned substantially perpendicular to the longitudinal axis of the terminal pin.

10. The lid assembly of claim 8, wherein the first end of the inner ferrule extends for a greater distance along the longitudinal axis of the terminal pin than the first end of the outer ferrule.

11. The lid assembly of claim 8, wherein the inner and outer ferrules are selected from titanium, stainless steel, mild steel, nickel-plated mild steel, and aluminum.

12. The lid assembly of claim 8, wherein the terminal pin is selected from MP35N, stainless steel, a titanium alloy, platinum, a platinum alloy, palladium, a palladium alloy, and molybdenum.

13. The case-neutral electrochemical cell of claim 1, wherein the terminal pin is selected from MP35N, stainless steel, a titanium alloy, platinum, a platinum alloy, palladium, a palladium alloy, and molybdenum.

\* \* \* \* \*